(12) United States Patent
Miseiko et al.

(10) Patent No.: US 12,095,800 B1
(45) Date of Patent: Sep. 17, 2024

(54) AUTOMATED ASSESSMENT SCHEDULING

(71) Applicant: Rapid7, Inc., Boston, MA (US)

(72) Inventors: Paul Miseiko, Mississauga (CA); James Cancilla, Milton (CA)

(73) Assignee: Rapid7, Inc., Boston, MA (US)

( * ) Notice: Subject to any disclaimer, the term of this patent is extended or adjusted under 35 U.S.C. 154(b) by 286 days.

(21) Appl. No.: 17/512,798

(22) Filed: Oct. 28, 2021

(51) Int. Cl.
*H04L 9/40* (2022.01)
*G06F 9/50* (2006.01)

(52) U.S. Cl.
CPC ........ *H04L 63/1433* (2013.01); *G06F 9/5005* (2013.01)

(58) Field of Classification Search
None
See application file for complete search history.

(56) References Cited

U.S. PATENT DOCUMENTS

| | | | |
|---|---|---|---|
| 7,203,960 B1 | 4/2007 | Painter | |
| 7,712,138 B2 | 5/2010 | Zobel et al. | |
| 8,037,475 B1 * | 10/2011 | Jackson | G06F 9/5011 709/224 |
| 9,106,661 B1 * | 8/2015 | Stamos | G06F 9/54 |
| 11,030,562 B1 | 6/2021 | Dean et al. | |
| 11,757,907 B1 | 9/2023 | Berger et al. | |
| 2002/0104014 A1 | 8/2002 | Zobel et al. | |
| 2005/0010821 A1 | 1/2005 | Cooper et al. | |
| 2005/0154733 A1 | 7/2005 | Meltzer et al. | |
| 2011/0125539 A1 * | 5/2011 | Bollapragada | G06Q 10/043 705/7.12 |
| 2013/0067578 A1 | 3/2013 | Dool et al. | |
| 2014/0173739 A1 * | 6/2014 | Ahuja | G06F 21/577 726/25 |

* cited by examiner

*Primary Examiner* — Brandon Hoffman
(74) *Attorney, Agent, or Firm* — Ashwin Anand

(57) ABSTRACT

Various embodiments include systems and methods of implementing automated assessment scheduling. A particular automated assessment may be automatically performed based at least in part on an assessment configuration and scan engine resource(s) of an organization. Based at least in part on performance of the particular automated assessment, a scan engine utilization assessment may be performed to determine a scan engine utilization value that represents utilization of the scan engine resource(s) with respect to resource requirements that are based at least in part on the set of attributes of the assessment configuration. Based at least in part on the scan engine utilization assessment, a particular resource utilization recommendation may be generated. The particular resource utilization recommendation may correspond to a first resource utilization recommendation to allocate additional scan engine resources or a second resource utilization recommendation to allocate fewer scan engine resources.

20 Claims, 9 Drawing Sheets

800

Receive a set of scheduling parameters, comprising a frequency corresponding to how often assessments are to be completed via a particular automated assessment and a type of assessment to perform in the particular automated assessment
810

Generate, based at least in part on the set of scheduling parameters, an assessment configuration comprising a set of attributes defining how the particular automated assessment is to be performed
820

Identify at least one scan engine resource of a set of scan engine resources for utilization in the particular automated assessment
830

Automatically initiate, based at least in part on the assessment configuration and using the at least one scan engine resource, the particular automated assessment
840

*FIG. 8*

AUTOMATED ASSESSMENT SCHEDULING

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Additionally, flaws or defects in the configuration (policy and/or compliance) and version (missing patches) of software could allow for the introduction of malware and/or the existence of an attack surface. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities. Typically, a company may utilize scheduled scans to manage the impact of scanning their networks and resources, to achieve scheduled informational cadence on their security posture, and to manage console and scan engine utilization. Such calendar-based scan scheduling can be time consuming and complex to configure and maintain. Accordingly, there is a need for improved systems and methods of managing assessment scheduling.

SUMMARY OF EMBODIMENTS

The systems and methods described herein may be employed in various combinations and in embodiments to implement automated assessment scheduling. The systems and methods of the present disclosure may provide numerous advantages over conventional calendar-based scan scheduling techniques, which can be time consuming and complex to configure and maintain. With the systems and methods of the present disclosure, a user can answer basic questions that define their scan scheduling preferences. In the present disclosure, an automated scheduler may then determine the appropriate utilization of available scan engine resources to accomplish the user's desired scan scheduling preferences. The systems and methods of the present disclosure may allow the user to achieve value from a assessment product faster, to utilize the product more efficiently, and to reduce the complexity associated with understanding and managing scan engine utilization.

BRIEF DESCRIPTION OF THE DRAWINGS

FIG. 8 is a diagram that illustrates an example of an automated assessment scheduling process, according to some embodiments.

Figure 1:
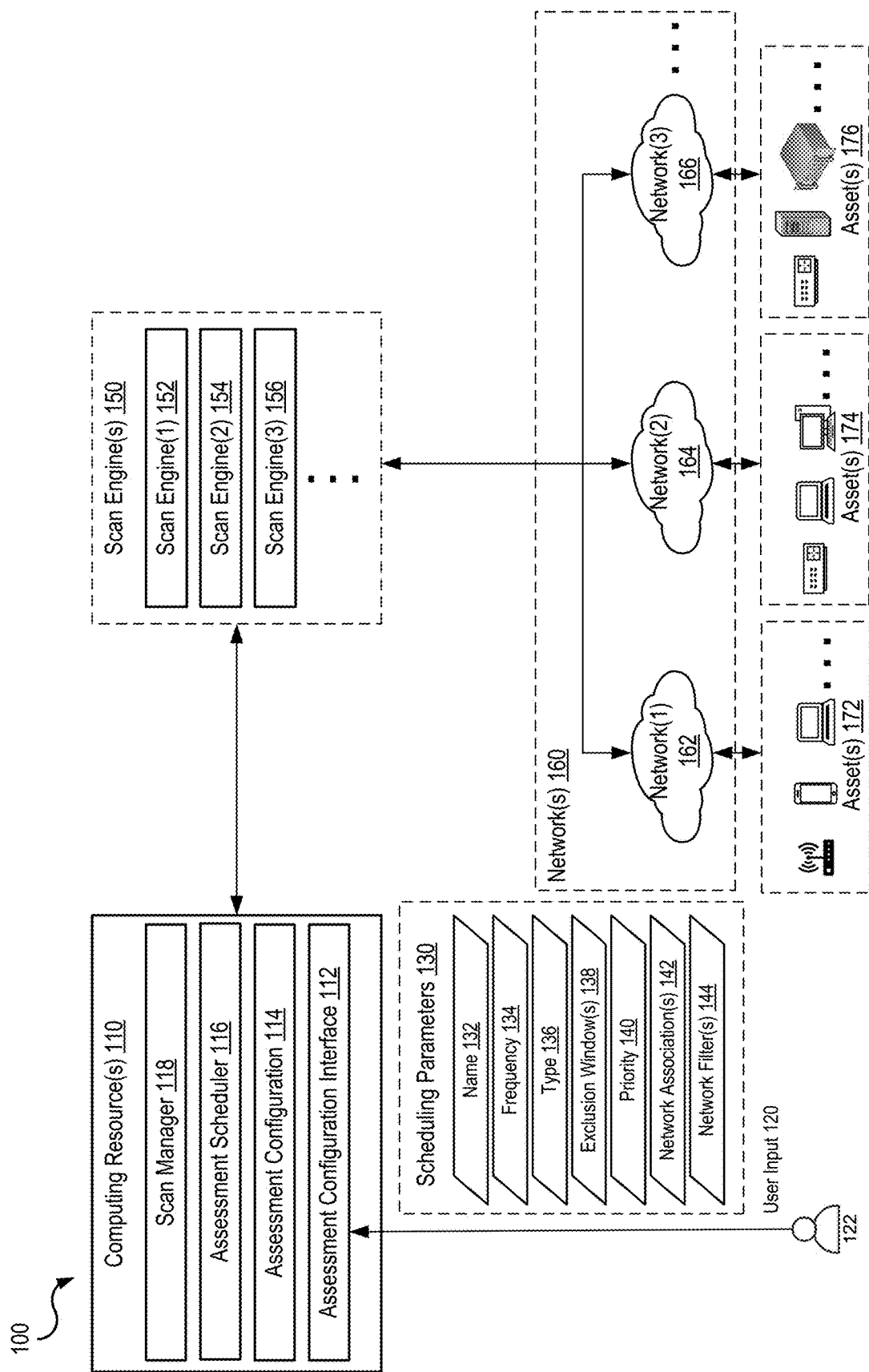
FIG. 1 is a block diagram illustrating an example system that implements automated assessment scheduling, in accordance with some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure relates to systems and methods of automated assessment scheduling. The systems and methods of the present disclosure may provide numerous advantages over conventional calendar-based scan scheduling techniques, which can be time consuming and complex to configure and maintain. With the systems and methods of the present disclosure, a user can answer basic questions that define their scan scheduling preferences, such as: the frequency that networks and resources are to be scanned; when those networks and resources should not be scanned; what type of scan should be done against those networks and resources; and what scan engines can be used to scan those networks and resources. In the present disclosure, an automated scheduler may then determine the appropriate utilization of available scan engine resources to accomplish the user's desired scan scheduling preferences. The systems and methods of the present disclosure may allow the user to achieve value from a assessment product faster, to utilize the product more efficiently, and to reduce the complexity associated with understanding and managing scan engine utilization.

The systems and methods of the present disclosure may also provide the ability to identify when there are insufficient scan engine resources to accomplish desired scan scheduling preferences. In such cases, the user may be provided with feedback on whether or not additional resources are recommended as well as estimates on those additional resource recommendations. The systems and methods of the present disclosure may also provide the ability to identify over-provisioning of resources (that is, an excess number of scan engines). In such cases, the user may be provided with feedback to reduce the provisioned scan engine resources.

In the present disclosure, a user may be presented with a set of questions related to scan scheduling parameters. The answers to these questions may be utilized to automatically create scan schedules that satisfy the scan scheduling parameters described by the user. In some cases, for presentation to a user, the term "scan" may be substituted with the term "assessment" to qualify the action of assessing a network, resource, or asset, thereby simplifying terminology for the user as the term "scan" represents a means to achieve an ultimate goal of an assessment. It should be noted that when a schedule is configured, it might be a schedule against a network and not an asset and that as part of that schedule, the scan engine may discover live assets on the network. Furthermore, one or more live assets could be the same asset (e.g., a device with multiple IP addresses) on the same network, or on multiple networks such as one IP address on a first network and another IP address on a second network. Thus, some assessments could be of the network itself irrespective of "one or more assets of a particular network" and that assessment might be a combination of both discovering assets and assessing those assets even if the type of assessment is vulnerability or policy and not discovery, in some scenarios discovery might always be done. Furthermore, discovery assessment types might, by their nature, not have explicit assets to run against and instead discover assets available on the network.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements automated assessment scheduling, in accordance with some embodiments. The system 100 of FIG. 1 may simplify the management of complex assessment scheduling that includes multiple variables of consideration.

Figure 10:
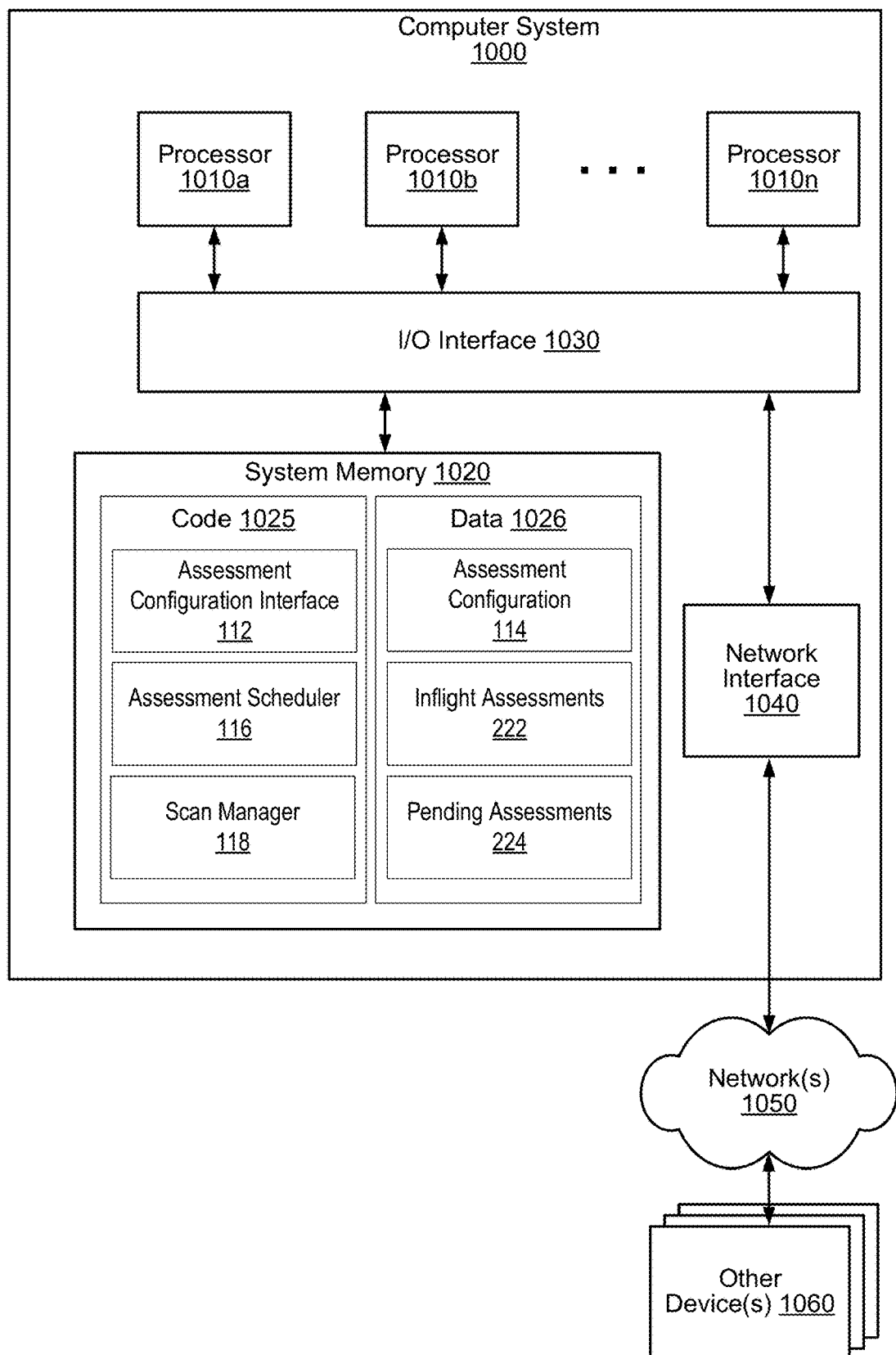
FIG. 10 is a block diagram illustrating an example computer system that may be used to implement one or more portions of a system that implements automated assessment scheduling, according to some embodiments.

FIG. 1 depicts one or more computing resources 110, which may include one or more hardware processors with associated memory (not shown, see e.g. FIG. 10). The computing resource(s) 110 may include one or more components that are configured to implement automated assessment scheduling, as described herein. In the embodiment depicted in FIG. 1, the computing resource(s) 110 include an assessment configuration interface 112, at least one assessment configuration 114, an assessment scheduler 116, and a scan manager 118.

According to various embodiments, the assessment configuration interface 112 may be configured to receive user input 120 from a user 122. The assessment configuration interface 112 may correspond to an application programming interface (API) or a graphical user interface (GUI), according to some embodiments. The user input 120 may include answers to a set of questions regarding particular scan scheduling requirements, and these answers may be utilized to automatically generate scan schedules that meet these scan scheduling requirements. A first example question in the set of questions may be related to how frequently the user 122 wants a given network, resource, or asset to be scanned. A second example in the set of questions may be related to what type of scan the user 122 wants performed against a given network, resource, or asset. Examples of types of scans may include discovery, vulnerability, or policy scanning, among other alternatives. A third example in the set of questions presented to the user 122 may be related to when a network, resource, or asset should not be scanned (also referred to herein as an "exclusion window"). A fourth example in the set of questions presented to the user 122 may be related to what scan engine resources can be utilized to scan a given network, resource, or asset. It will be appreciated that how such questions are presented to the user 122 via the assessment configuration interface 112 represent implementation details and that these questions could be presented to the user 122 as part of separate configuration phases. For example, scan engines could be assigned to networks, exclusion windows could be assigned to networks or could be assigned to both networks and scan configurations, while the scan type and frequency could be assigned to a scan configuration.

In the example depicted in FIG. 1, the user input 120 includes various scheduling parameters 130 that may be utilized to define various attributes of the assessment configuration 114. According to various embodiments, the scheduling parameters 130 received as part of the user input 120 may include one or more of: a name 132; a frequency 134; a type 136; one or more exclusion windows 138; a priority 140; one or more network associations 142; and one or more network filters 144.

The name 132 may be utilized to define a name attribute of the assessment configuration 114, where the name attribute corresponds to an assessment configuration name. The frequency 134 may be utilized to define a frequency attribute of the assessment configuration 114, where the frequency attribute corresponds to how often assessments are to be completed (also referred to herein as "scan cadence"). According to various embodiments, the frequency attribute may correspond to one of a daily scan cadence, a weekly scan cadence, or a monthly scan cadence, among other alternatives (e.g., semi-weekly, bi-weekly, semi-monthly, quarterly, etc.). In some cases, the frequency 134 could include relative start and stop dates, such as a weekly scan configured to start on a particular day (e.g., a Wednesday) of every week and to stop on another day (e.g., a Sunday). In some embodiments, the user input 120 may include an identification of a particular day that represents a start of a week (which may vary in different geographic locations).

The type 136 may be utilized to define a type attribute of the assessment configuration 114, where the type attribute corresponds to a particular type of assessment to be completed (also referred to herein as a "scan type"). According to various embodiments, the type attribute may correspond to a vulnerability assessment, a policy assessment, or a discovery assessment, among other alternatives.

The exclusion window(s) 138 may be utilized to define an exclusion window attribute of the assessment configuration 114, where the exclusion window attribute corresponds to when assessments are not to be performed (also referred to herein as a "blackout window"). Examples of exclusion windows may include a particular time of day (e.g., business hours), a particular day (or days) of a week, or a particular time (or times) of year (e.g., two weeks before a corporation's end of quarter), among numerous other alternatives.

According to some embodiments, the scheduling parameters 130 received as part of the user input 120 may include one or more inclusion windows (not shown in the example depicted in FIG. 1). Such inclusion window(s) may be utilized to define an inclusion window attribute of the assessment configuration 114, where the inclusion window attribute corresponds to when assessments are to be performed. That is, such an inclusion window attribute may represent the converse of the aforementioned exclusion window attribute of the assessment configuration 114.

The priority 140 may be utilized to define a priority attribute of the assessment configuration 114, where the priority attribute corresponds to a relative priority for how quickly an assessment is to be completed. According to various embodiments, the priority attribute may correspond to a low priority, a normal priority, or a high priority, among other alternatives.

The network association(s) 142 may be utilized to define a network associations attribute of the assessment configuration 114, where the network associations attribute corresponds to one or more networks to be assessed. The network filter(s) 144 may be utilized to define a network filters attribute of the assessment configuration 114, where the network filters attribute corresponds to one or more network filters to be applied to the network(s) to be assessed. Thus, the network association(s) 142 in combination with the network filter(s) 144 may be utilized to limit the scope of what is assessed on one or more identified networks by the assessment configuration 114.

The assessment scheduler 116 and the scan manager 118 may be configured to utilize the attributes of the assessment configuration 114 for automated assessment scheduling, as further described herein.

FIG. 1 illustrates that various components of the computing resource(s) 110 may be configured to communicate with a set of (one or more) scan engines 150 (also referred to herein as "scan engine resources"), which are devices that communicate with assets on a network to discover insights. In the particular embodiment depicted in FIG. 1, the set of scan engines 150 includes multiple engines, including at least a first scan engine 152, a second scan engine 154, and a third scan engine 156. Various operations may be performed by a particular scan engine, including: discovery of live assets within a network; fingerprinting what (network) services, software, configurations, operating system, and capabilities a live asset has and/or could/might/will provide within a network; and the assessment of live assets within a network, including but not limited to vulnerability and policy (compliance) assessments.

FIG. 1 further illustrates that the scan engine(s) 150 may be configured to communicate with a set of (one or more) networks 160. In the particular embodiment depicted in FIG. 1, the set of networks 160 includes multiple networks, including at least a first network 162, a second network 164, and a third network 166. An individual network may include one or more Internet Protocol (IP) addresses with assets on it that the user 122 wants insights for. For example, FIG. 1 illustrates that the first network 162 may include a first set of IP addresses associated with a first set of assets 172. As another example, FIG. 1 illustrates that the second network 164 may include a second set of IP addresses associated with a second set of assets 174. As yet another example, FIG. 1 illustrates that the third network 166 may include a third set of IP addresses associated with a third set of assets 176.

According to some embodiments, the assessment scheduler 116 in combination with the scan manager 118 may be configured to target distribution of assessments/scans based on scan engine load. To illustrate, when two or more scan engines of the set of scan engines 150 can scan a particular network node of the network(s) 160, the assessment scheduler 116 may be configured to assign one of the available scan engines to scan the particular network node. The particular network node may correspond to an IP address or a domain name within a particular network of the network(s) 160 in the example depicted in FIG. 1. That is, the particular network node may correspond to a subset of a particular network (e.g., a subset of one of the first network 162, the second network 164, or the third network 166). The assessment scheduler 116 may be configured to assign assessment task(s) to a particular scan engine of the set of scan engines 150 based on whether or not that particular scan engine is capable of executing more assessment tasks. As the particular scan engine has a finite amount of resources (e.g., CPU, memory, disk, etc.), the assessment scheduler 116 may be configured to avoid assigning additional assessment tasks to the particular scan engine if that scan engine does not have sufficient resources to service such additional assessment tasks.

A particular scan engine of the set of scan engines 150 may be capable of scanning multiple network nodes in parallel and each individual network node being scanned utilizes some amount of resources of the scan engine to service. According to some embodiments, one algorithm may involve dividing available resources by an average amount of resources associated with scanning an individual network node to determine a maximum number of network nodes that a particular scan engine may be able to service. In some cases, this algorithm may be ineffective, and in some cases the particular scan engine may exhaust its memory resources while performing assessment task(s). When the particular scan engine exhausts its memory resources, information about the network node(s) being scanned may be provided as feedback to the assessment scheduler 116 to mitigate the potential for future memory exhaustion issues by assigning weights to those particular network node(s). For example, in some cases scanning a Windows® domain controller may involve utilizing more resources relative to a Windows® workstation. Therefore, a higher "weight" may be associated with scanning a Windows® domain controller as part of an evaluation regarding whether a particular scan engine has sufficient available resources to perform the assessment task(s). In this example, a "weight" may represent a percentage multiplier of resources to be utilized for scanning a particular network node relative to an average of resources for scanning of network nodes. In some cases, this could be a positive weight (e.g., greater than 100 percent) or a negative weight (e.g., less than 100 percent).

According to some embodiments, the "weight" of a particular network node could be further influenced by a particular type of scan that the assessment scheduler 116 has identified to perform against that particular network node. To illustrate, a vulnerability scan without credentials (also referred to as an "unauthenticated" scan) could have a relatively low weight due to restricted access that reduces the amount of collectable information about that network node. By contrast, a vulnerability scan with credentials (also referred to as an "authenticated" scan) could have a relatively high weight due to access that allows a more comprehensive collection of information about that network node. In such cases, if a "high weight" network node is pending alongside one or more "low weight" network nodes, the assessment scheduler 116 may be configured to mitigate the potential for the "low weight" network node(s) to "starve" the "high weight" network node of scan engine resources to perform assessment task(s) on the "high weight" network node. That is, according to some embodiments, the assessment scheduler 116 may be configured to determine whether to instruct a scan engine to initiate assessment task(s) on "low weight" network nodes or to wait to initiate assessment task(s) until enough scan engine resources are available to service a "high weight" network node. In some embodiments, the assessment scheduler 116 may be configured to evaluate historical scan times associated with "inflight" network nodes (as described further herein with respect to FIG. 2, as an example) to identify a particular scan engine of the set of scan engines 150 to be assigned to perform assessment task(s) on the "high weight" network node. Additionally, in some embodiments, the assessment scheduler 116 may be configured to determine whether or not a particular scan engine of the set of scan engines 150 is capable of servicing a "high weight" network node. That is, the assessment scheduler 116 may be configured to determine whether the particular scan engine has enough total resources (if all resources are available) to service the "high weight" network node.

According to some embodiments, with automated scan schedules according to the present disclosure, the user 122 may no longer provide an explicit date or time for when to begin an assessment/scan. As described herein, the automated scan schedules of the present disclosure may utilize information provided by the user 122, such as how often a scan is to be performed, the particular type of scan to be performed, whether particular assets are to be scanned or not, and particular scan engine resources to be utilized. A typical workflow involves the ability to report scan results on a regular basis. Automated scan schedules according to the present disclosure may improve the overall experience of scheduling scans but may not address the "freshness" of the data relative to when the user 122 seeks to have a report on the results. To illustrate, the user 122 may desire for a scan to run monthly and to have a report of the associated scan results on the first day of the next month. In this example, the earlier in the month that the scans/assessments are actually performed, the more outdated that data is by the time the results are to be reported. Accordingly, in some embodiments, the assessment scheduler 116 may be configured to schedule a scan/assessment such that the scan/assessment is able to finish as close to a desired reporting date as possible. The systems and methods of the present disclosure may address this problem by using historical scan/assessment times (as described further herein with respect to FIG. 2, as an example) for a given scan in order to build a model to identify a particular start time for a scan/assessment so that the scan/assessment is capable of being completed as close to an end of the scan window as possible. Thus, according to some embodiments, the assessment scheduler 116 may be configured to generate automated scan schedules that are designed to identify a particular time to start a scan so that the resulting data is as fresh as possible at a time that a report of the results is to be utilized and/or acted upon by the user 122.

Thus, FIG. 1 illustrates that the system 100 may be utilized to implement automated assessment scheduling, which may simplify the management of complex assessment scheduling that includes multiple variables of consideration. In FIG. 1, the user 122 may answer basic questions that define their scan scheduling preferences, and the system 100 may then determine the appropriate utilization of available scan engine resources to accomplish the user's desired scan scheduling preferences. As described herein, the system 100 of FIG. 1 may allow the user 122 to achieve value from a assessment product faster, to utilize the product more efficiently, and to reduce (or eliminate) the complexity associated with understanding and managing scan engine utilization.

Figure 2:
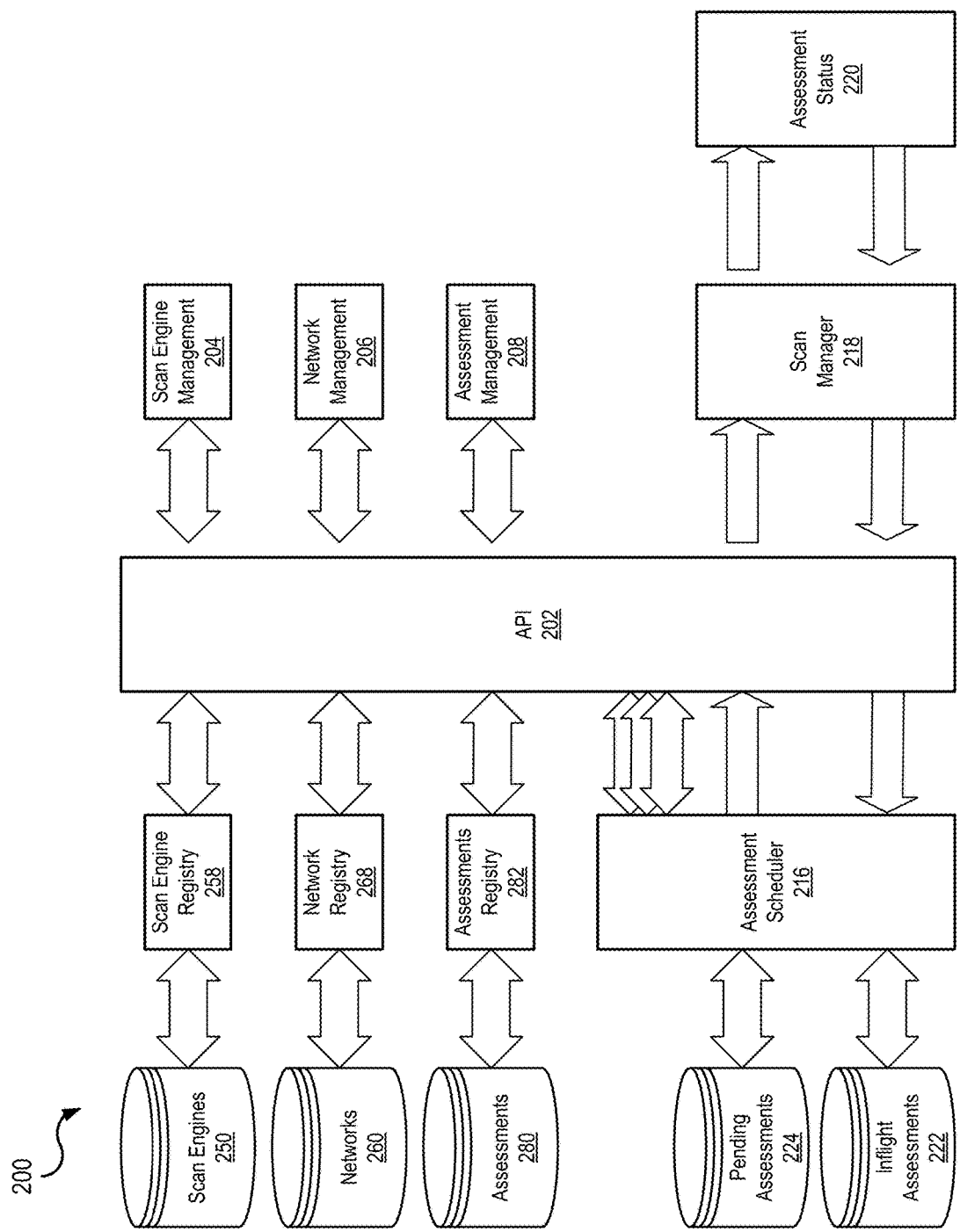
FIG. 2 is a block diagram illustrating an example automated assessment scheduling architecture, in accordance with some embodiments.

Referring to FIG. 2, a block diagram 200 illustrates an example automated assessment scheduling architecture, according to various embodiments.

FIG. 2 illustrates that an application programming interface (API) 202 may be utilized for scan engine management 204, network management 206, and assessment management 208, according to some embodiments. FIG. 2 further illustrates that the API 202 may be utilized by an assessment scheduler 216 and a scan manager 218. According to some embodiments, the assessment scheduler 216 of FIG. 2 may correspond to the assessment scheduler 116 depicted in FIG. 1, and the scan manager 218 of FIG. 2 may correspond to the scan manager 118 depicted in FIG. 1.

The scan manager 218 may be configured to track an assessment status 220. The assessment status 220 may contain information regarding various attributes associated with an assessment status of individual assessments. According to some embodiments, various attributes associated with an assessment status of a particular assessment may include one or more of: a network attribute; a network node attribute; a scan engine attribute; a credentials attribute; a reason attribute; a priority attribute; a pending attribute; and an inflight attribute. The network attribute may correspond to a network associated with the particular assessment. The network node attribute may correspond to the IP address or domain name associated with the particular assessment. The scan engine attribute may correspond to a scan engine assigned to the particular assessment. The credentials attribute may correspond to credentials associated with the particular assessment. The reason attribute may correspond to a reason for the particular assessment (e.g., ad-hoc, scheduled, remediation, tag, etc.). The priority attribute may correspond to how quickly a user seeks to have the particular assessment completed (e.g., low priority, normal priority, high priority, etc.). The pending attribute may correspond to whether or not the particular assessment is pending. The inflight attribute may correspond to whether or not the particular assessment is inflight.

According to some embodiments, the assessment status 220 may contain additional information regarding various attributes associated with assessment statuses. According to some embodiments, various attributes associated with the assessment statuses may include one or more of: a pending networks attribute; an inflight networks attribute; a pending network nodes attribute; an inflight network nodes attribute; a pending reason attribute; and an inflight reason attribute. The pending networks attribute may correspond to networks with pending assessment statuses. The inflight networks attribute may correspond to networks with inflight assessment statuses. The pending network nodes attribute may correspond to network nodes with pending assessment statuses (e.g., IP addresses or domain names). The inflight network nodes attribute may correspond to network nodes with inflight assessment statuses (e.g., IP addresses or domain names). The pending reason attribute may correspond to a reason (e.g., ad-hoc, scheduled, remediation, tag, etc.) associated with pending assessment statuses. The inflight reason attribute may correspond to a reason (e.g., ad-hoc, scheduled, remediation, tag, etc.) associated with inflight assessment statuses.

The assessment scheduler 216 may utilize the assessment status 220 (e.g., at least pending/inflight status information) received from the scan manager 218 to store data related to one or more inflight assessments 222 and to store data related to one or more pending assessments 224. An example of utilization of the data related to inflight assessments 222 and the pending assessments 224 are further described herein with respect to the example process of automated assessment scheduling depicted in FIG. 3.

With respect to the scan engine management 204, FIG. 2 illustrates that the API 202 may be utilized to manage data related to one or more scan engines 250 (e.g., via a scan engine registry 258). According to some embodiments, the data related to the one or more scan engines 250 may correspond to data related to the set of one or more scan engines 150 depicted in FIG. 1 (e.g., data related to at least the first scan engine 152, the second scan engine 154, and the third scan engine 156).

With respect to the network management 206, FIG. 2 illustrates that the API 202 may be utilized to manage data related to one or more networks 260 (e.g., via a network registry 268). According to some embodiments, the data related to the one or more networks 260 may correspond to data related to the one or more networks 160 depicted in FIG. 1 (e.g., data related to at least the first network 162, the second network 164, and the third network 166).

The data related to the one or more networks 260 may correspond to information regarding various attributes associated with each individual network. According to some embodiments, various attributes associated with a particular network may include one or more of: a name; a parent network; an owner; a domain; a subdomain; IP address(es); domain name(s); domain name system (DNS) server(s); dynamic host configuration protocol (DHCP) server(s); router(s); and a public/private attribute. The name attribute may correspond to a network name associated with the particular network. The parent network attribute may correspond to a parent network associated with the particular network. The owner attribute may correspond to a person responsible for the particular network. The domain attribute may correspond to an automatic correlation of devices found to be a member of a particular domain (e.g., rapid7.com). The subdomain attribute may correspond to an automatic correlation of devices found to be a member of a particular sub domain (e.g., tor.rapid7.com; yyz.rapid7.com; etc.). The IP address(es) attribute may correspond to one or more IP addresses associated with the particular network. The domain name(s) attribute may correspond to one or more domain names associated with the particular network. This information can be represented as: one or more individual IP addresses; one or more IP ranges; or one or more individual IP CIDR (classless inter-domain routing) values. The DNS server(s) attribute may correspond to one or more DNS servers associated with the particular network (e.g., the IP and MAC addresses if applicable). The DHCP server(s) attribute may correspond to one or more DHCP servers associated with the particular network (e.g., the IP and MAC addresses if applicable). The router(s) attribute may correspond to one or more routers associated with the particular network (e.g., the IP and MAC addresses if applicable). The public/private attribute may correspond to whether or not the particular network is public or private (where a public network can be scanned with a hosted scan engine). In addition to identifying whether the particular network can be scanned with a hosted scan engine, the public/private attribute may optionally be utilized to further classify risk (e.g., assets on a public network might have a higher risk versus assets on a private network, in some cases).

With respect to the assessment management 208, FIG. 2 illustrates that the API 202 may be utilized to manage data related to one or more assessments 280 (e.g., via an assessment registry 282).

According to some embodiments, the assessment scheduler 216 and/or the scan manager 218 may be configured to access, via the API 202, the scan engine registry 258 to retrieve selected information associated with at least one scan engine from the data related to the one or more scan engines 250. According to some embodiments, the assessment scheduler 216 and/or the scan manager 218 may be configured to access, via the API 202, the network registry 268 to retrieve selected information associated with at least one network from the data related to the one or more networks 260. According to some embodiments, the assessment scheduler 216 and/or the scan manager 218 may be configured to access, via the API 202, the assessment registry 282 to retrieve selected information associated with at least one assessment from the data related to the one or more assessments 280.

Thus, the automated assessment scheduling architecture depicted in the example of FIG. 2 may be utilized to implement automated assessment scheduling according to the present disclosure, which may simplify the management of complex assessment scheduling that includes multiple variables of consideration.

Figure 3:
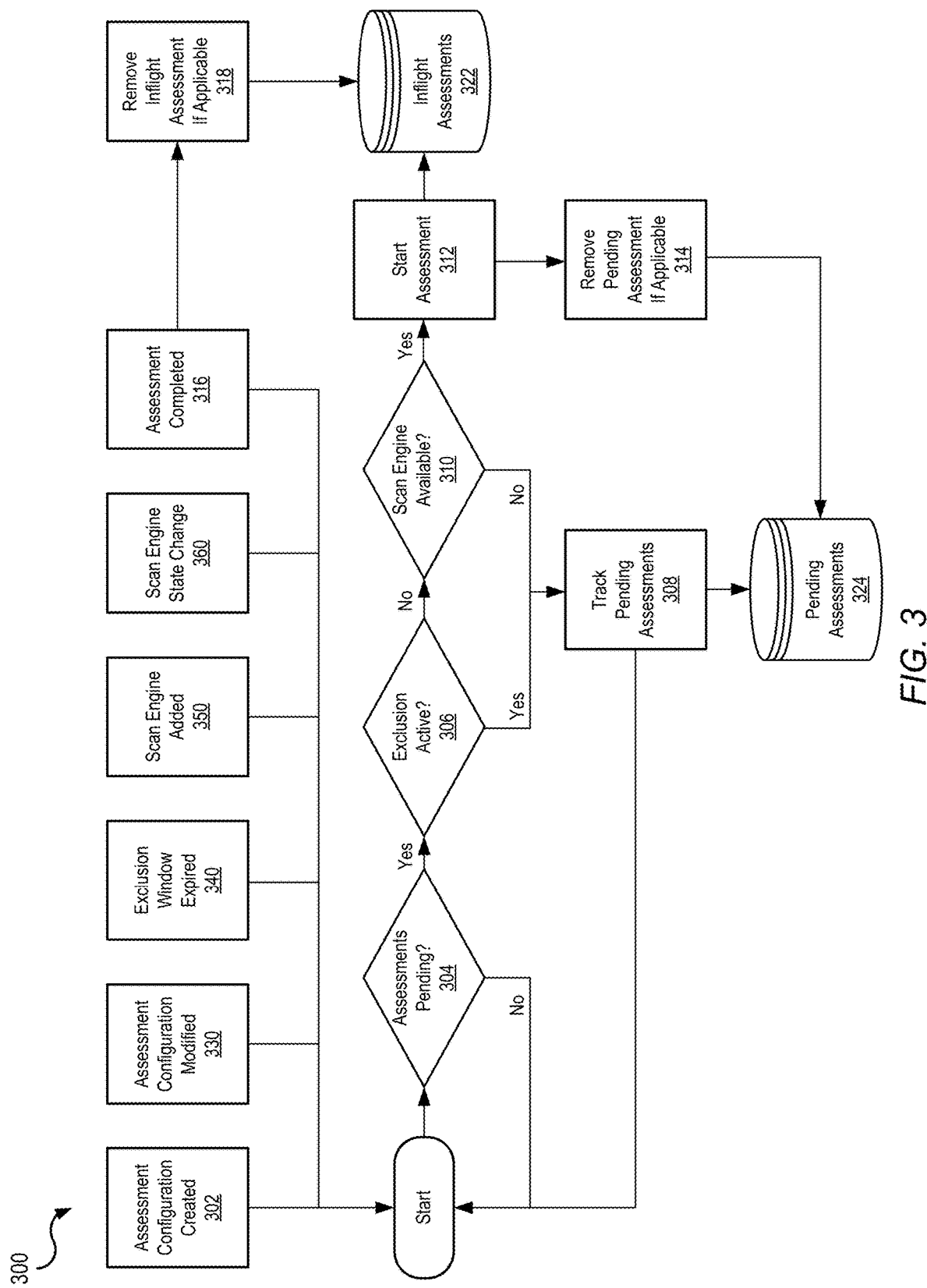
FIG. 3 is a block diagram illustrating an example process of automated assessment scheduling, in accordance with some embodiments.

Referring to FIG. 3, a block diagram 300 illustrates an example process of automated assessment scheduling, according to various embodiments.

According to some embodiments, FIG. 3 illustrates that the process of automated assessment scheduling may start responsive to creation of an assessment configuration, at operation 302. For example, the process of automated assessment scheduling may start responsive to creation of the assessment configuration 114 of FIG. 1.

At operation 304, FIG. 3 illustrates that the process of automated assessment scheduling may include determining whether one or more assessments are pending. For example, FIG. 3 illustrates data related to one or more pending assessments 324, which may be utilized to determine whether there are assessments that are pending. According to some embodiments, the data related to one or more pending assessments 324 depicted in FIG. 3 may correspond to the data related to one or more pending assessments 224 of FIG. 2. Upon determining that there are pending assessment(s), the process of automated assessment scheduling may proceed to operation 306. When there are no pending assessments, the process of automated assessment scheduling may return to start.

At operation 306, FIG. 3 illustrates that the process of automated assessment scheduling may include determining whether an exclusion is active. For example, the determination may be based on the exclusion window(s) 138 of the scheduling parameters 130 received as part of the user input 120, as depicted in FIG. 1. As previously described herein with respect to FIG. 1, the exclusion window(s) 138 may be utilized to define an exclusion window attribute of the assessment configuration 114, where the exclusion window attribute corresponds to when assessments are not to be performed. Upon determining that an exclusion is active, the process of automated assessment scheduling may proceed to operation 308. Upon determining that the exclusion is active, the process of automated assessment scheduling may proceed to operation 310.

At operation 308, FIG. 3 illustrates that the process of automated assessment scheduling may include tracking pending assessments. For example, FIG. 3 illustrates that tracking pending assessments may include accessing/updating the data related to one or more pending assessments 324. The process of automated assessment scheduling may then return to start.

At operation 310, FIG. 3 illustrates that the process of automated assessment scheduling may include determining whether at least one scan engine is available. In some cases, such an availability determination may be as simple as determining whether or not a scan engine exists for a particular network. In other cases, such an availability determination may be more complex, such as being based in whole or in part on a "weight" of a particular network node (e.g., "high" versus "low" weight, as previously described herein), among other alternatives. Upon determining that the scan engine(s) are available, the process of automated assessment scheduling may proceed to operation 312. When the scan engine(s) are unavailable, the process of automated assessment scheduling may return to operation 308.

At operation 312, FIG. 3 illustrates that the process of automated assessment scheduling may include starting an assessment. Various examples of assessments are illustrated and further described herein with respect to FIGS. 5 to 7. FIG. 3 illustrates that, after starting the assessment, the process of automated assessment scheduling may include updating/accessing data related to one or more inflight assessments 322 (e.g., to identify the assessment as an inflight assessment). According to some embodiments, the data related to one or more inflight assessments 322 depicted in FIG. 3 may correspond to the data related to one or more inflight assessments 222 of FIG. 2.

FIG. 3 further illustrates that, after starting the assessment, the process of automated assessment scheduling may proceed to operation 314. At operation 314, FIG. 3 illustrates that the process of automated assessment scheduling may include removing a pending assessment (if applicable). For example, removing the pending assessment may include accessing/updating the data related to one or more pending assessments 324.

FIG. 3 illustrates that upon completion of the assessment, at operation 316, the process of automated assessment scheduling may proceed to operation 318. At operation 318, FIG. 3 illustrates that the process of automated assessment scheduling may include removing an inflight assessment (if applicable). For example, removing the inflight assessment may include accessing/updating the data related to one or more inflight assessments 322 (e.g., to identify the assessment as no longer being an inflight assessment).

According to some embodiments, FIG. 3 illustrates that the process of automated assessment scheduling may start responsive to modification of an assessment configuration, at operation 330. For example, the process of automated assessment scheduling may start responsive to modification of the assessment configuration 114 of FIG. 1.

According to some embodiments, FIG. 3 illustrates that the process of automated assessment scheduling may start responsive to determining that an exclusion window has expired, at operation 340. For example, the determination may be based on the exclusion window(s) 138 of the scheduling parameters 130 received as part of the user input 120, as depicted in FIG. 1. As previously described herein with respect to FIG. 1, the exclusion window(s) 138 may be utilized to define an exclusion window attribute of the assessment configuration 114, where the exclusion window attribute corresponds to when assessments are not to be performed.

According to some embodiments, FIG. 3 illustrates that the process of automated assessment scheduling may start responsive to a scan engine being added, at operation 350. For example, referring to FIG. 2, the process of automated assessment scheduling may start responsive to the assessment scheduler 216 receiving information from the scan manager 218 that is indicative of a scan engine being added.

According to some embodiments, FIG. 3 illustrates that the process of automated assessment scheduling may start responsive to a scan engine state change, at operation 360. For example, referring to FIG. 2, the process of automated assessment scheduling may start responsive to the assessment scheduler 216 receiving information from the scan manager 218 that is indicative of a scan engine state change.

Thus, the example process of automated assessment scheduling architecture depicted in FIG. 3 illustrates that the automated assessment scheduling process of the present disclosure may simplify the management of complex assessment scheduling that includes multiple variables of consideration.

Figure 4:
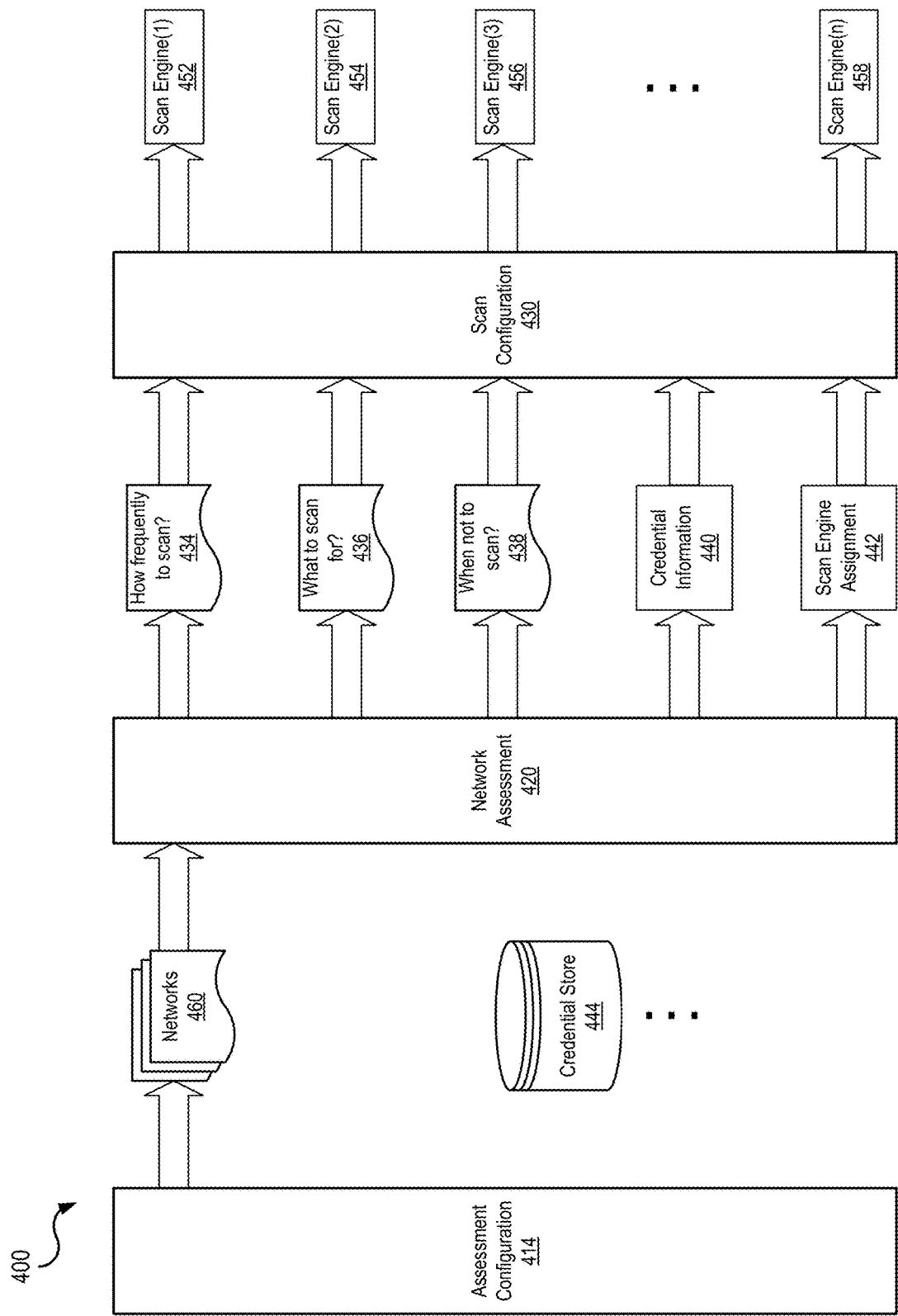
FIG. 4 is a block diagram illustrating an example automated assessment scheduling workflow, in accordance with some embodiments.

Referring to FIG. 4, a block diagram 400 illustrates an example automated assessment scheduling workflow, according to various embodiments. FIG. 4 illustrates that the automated assessment scheduling workflow may include an assessment configuration 414, a network assessment 420, and a scan configuration 430, according to some embodiments.

According to some embodiments, the assessment configuration 414 of FIG. 4 may correspond to the assessment configuration 114 of FIG. 1. FIG. 4 illustrates that the network assessment 420 may utilize information associated with one or more networks 460 from the assessment configuration 414. According to some embodiments, information associated with the one or more networks 460 of FIG. 4 may correspond to information associated with the one or more networks 160 of FIG. 1 (e.g., the first network 162, the second network 164, and the third network 166).

FIG. 4 illustrates that the network assessment 420 may provide various information to the scan configuration 430. FIG. 4 illustrates that, according to some embodiments, the information may include: information regarding how frequently to scan 434; information regarding what to scan for 436; information regarding when not to scan 438; credential information 440; and information regarding scan engine assignment 442.

According to some embodiments, the information regarding how frequently to scan 434 in the example depicted in FIG. 4 may correspond to the frequency 134 of the scheduling parameters 130 received as part of the user input 120, as depicted in FIG. 1. As previously described herein with respect to FIG. 1, the frequency 134 may be utilized to define the frequency attribute of the assessment configuration 114 (which may correspond to the assessment configuration 414 of FIG. 4), where the frequency attribute corresponds to how often assessments are to be completed (also referred to herein as "scan cadence"). According to various embodiments, the frequency attribute may correspond to one of a daily scan cadence, a weekly scan cadence, or a monthly scan cadence, among other alternatives.

According to some embodiments, the information regarding what to scan for 436 in the example depicted in FIG. 4 may correspond to the type 136 of the scheduling parameters 130 received as part of the user input 120, as depicted in FIG. 1. As previously described herein with respect to FIG. 1, the type 136 may be utilized to define a type attribute of the assessment configuration 114 (which may correspond to the assessment configuration 414 of FIG. 4), where the type attribute corresponds to a particular type of assessment to be completed (also referred to herein as a "scan type"). According to various embodiments, the type attribute may correspond to a vulnerability assessment, a policy assessment, or a discovery assessment, among other alternatives.

According to some embodiments, the information regarding when not to scan 438 in the example depicted in FIG. 4 may correspond to the exclusion window(s) 138 of the scheduling parameters 130 received as part of the user input 120, as depicted in FIG. 1. As previously described herein with respect to FIG. 1, the exclusion window(s) 138 may be utilized to define an exclusion window attribute of the assessment configuration 114 (which may correspond to the assessment configuration 414 of FIG. 4), where the exclusion window attribute corresponds to when assessments are not to be performed (also referred to herein as a "blackout window"). Examples of exclusion windows may include business hours, particular days of the week, or particular times of the year (e.g., two weeks before a corporation's end of quarter), among numerous other alternatives.

According to some embodiments, the credential information 440 may be obtained from at least one credential store 444 (e.g., one or more of a platform credential store, an on-premises credential store, and a third-party credential store). The at least one credential store 444 may contain information regarding various attributes associated with credentials. According to some embodiments, various attributes associated with a particular credential may include one or more of: a name attribute; a credential attribute; a network association attribute; a last used attribute; a successes attribute; a failures attribute; a successful network nodes attribute; a successful assets attribute; a failing network nodes attribute; and a failing assets attribute. The name attribute may correspond to a credential name. The credential attribute may correspond to a credential blob. The network association attribute may correspond to what networks the particular credential is associated with. The last used attribute may correspond to when the particular credential was last used. The successes attribute may correspond to how many times the particular credential has been successfully used. The failures attribute may correspond to how many times the particular credential has failed. The successful network nodes attribute may correspond to what network nodes have used the particular credential successfully. The successful assets attribute may correspond to what assets have used the particular credential successfully. The failing network nodes attribute may correspond to network nodes where the particular credential was not successful. The failing assets attribute may correspond to assets where the particular credential was not successful.

According to some embodiments, the scan engine assignment 442 may contain information regarding various attributes associated with a particular scan engine. According to some embodiments, various attributes associated with a particular scan engine may include one or more of: a name attribute; a cryptographic signature attribute; a state attribute; an active attribute; a last seen attribute; a product version attribute; a content version attribute; and a network associations attribute. The name attribute may correspond to a name of the particular scan engine. The cryptographic signature attribute may correspond to a public key signature of the particular scan engine for secure communications. The state attribute may correspond to whether or not the particular scan engine is online. The active attribute may correspond to whether or not the particular scan engine is running a scan. The last seen attribute may correspond to a time of a last communication with the particular scan engine. The product version attribute may correspond to a product version associated with the particular scan engine. The content version attribute may correspond to a content version associated with the particular scan engine. The network associations attribute may correspond to what networks the particular scan engine is permitted to scan, which may enable users to manage network reachability, to manage network load, and to create scan engine pools.

FIG. 4 illustrates that the scan configuration 430 may be communicated to one or more scan engines. In the example depicted in FIG. 4, multiple scan engines are illustrated, including at least a first scan engine 452, a second scan engine 454, and a third scan engine 456. According to some embodiments, the first scan engine 452 of FIG. 4 may correspond to the first scan engine 152 of the set of scan engines 150 depicted in FIG. 1. According to some embodiments, the second scan engine 454 of FIG. 4 may correspond to the second scan engine 154 of the set of scan engines 150 depicted in FIG. 1. According to some embodiments, the third scan engine 456 of FIG. 4 may correspond to the third scan engine 156 of the set of scan engines 150 depicted in FIG. 1. FIG. 4 further illustrates that, in some embodiments, the scan configuration 430 may be communicated to one or more additional scan engines, up to and including scan engine(n) 458.

Thus, the automated assessment scheduling workflow depicted in the example of FIG. 4 illustrates that automated assessment scheduling according to the present disclosure may simplify the management of complex assessment scheduling that includes multiple variables of consideration.

Figure 5:
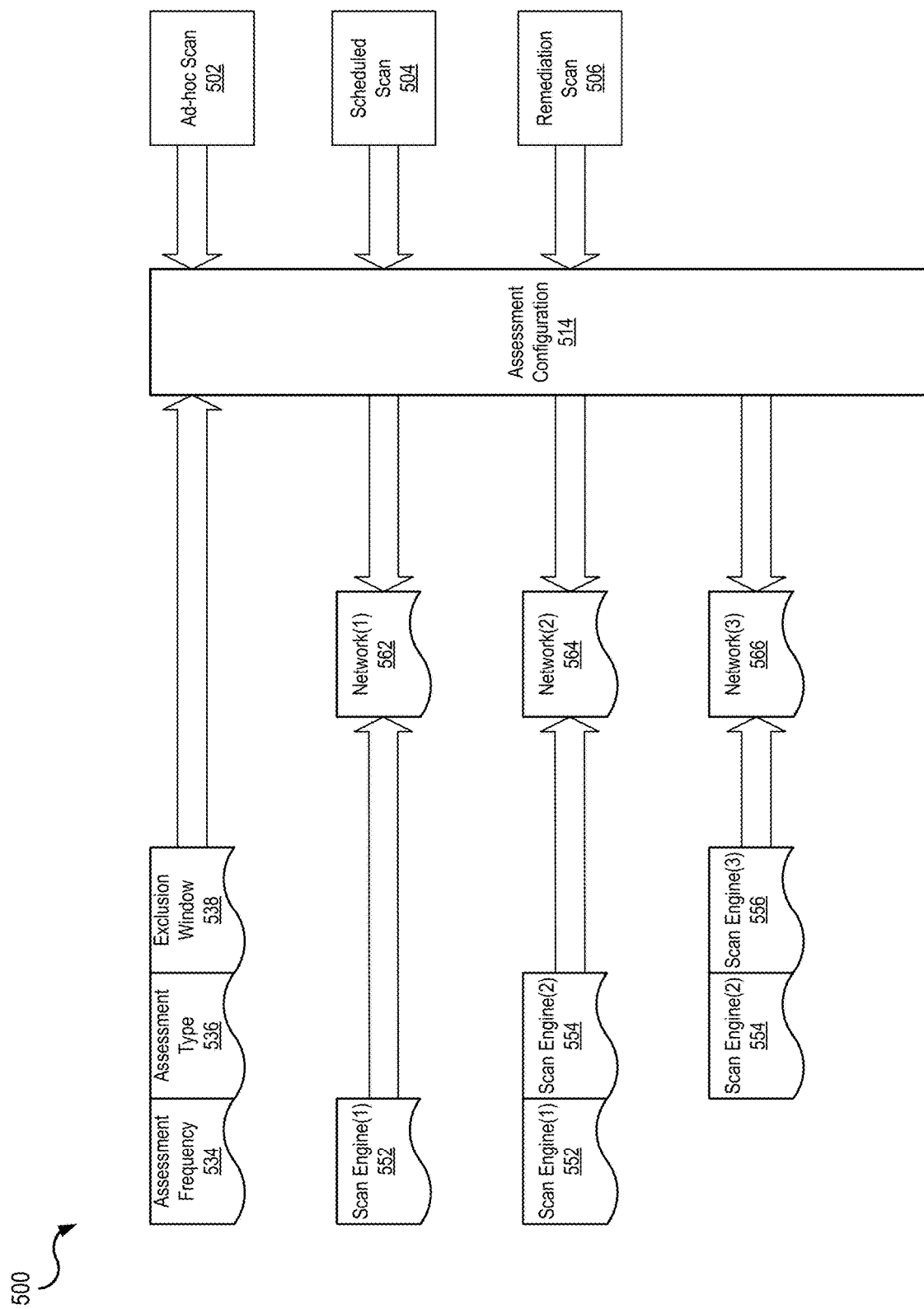
FIG. 5 is a block diagram illustrating an example automated assessment scheduling configuration workflow, in accordance with some embodiments.

Referring to FIG. 5, a block diagram 500 illustrates an example automated assessment scheduling configuration workflow, according to various embodiments.

FIG. 5 illustrates that an assessment configuration 514 according to the present disclosure may be utilized to perform an ad-hoc scan 502, a scheduled scan 504, or a remediation scan 506. According to some embodiments, the assessment configuration 514 of FIG. 5 may correspond to the assessment configuration 114 depicted in FIG. 1. FIG. 5 further illustrates that an assessment frequency 534, an assessment type 536, and an exclusion window 538 may represent inputs to the assessment configuration 514, according to various embodiments.

Figure 6:
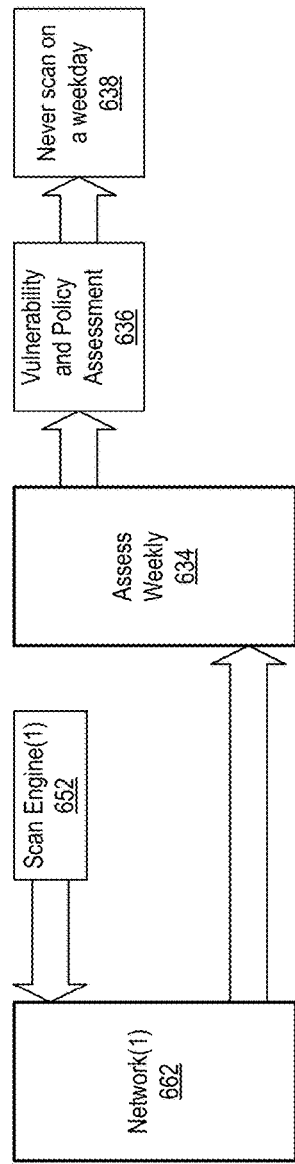
FIGS. 6 and 7 are block diagrams illustrating examples of automated assessment scheduling processes, in accordance with some embodiments.
Figure 7:
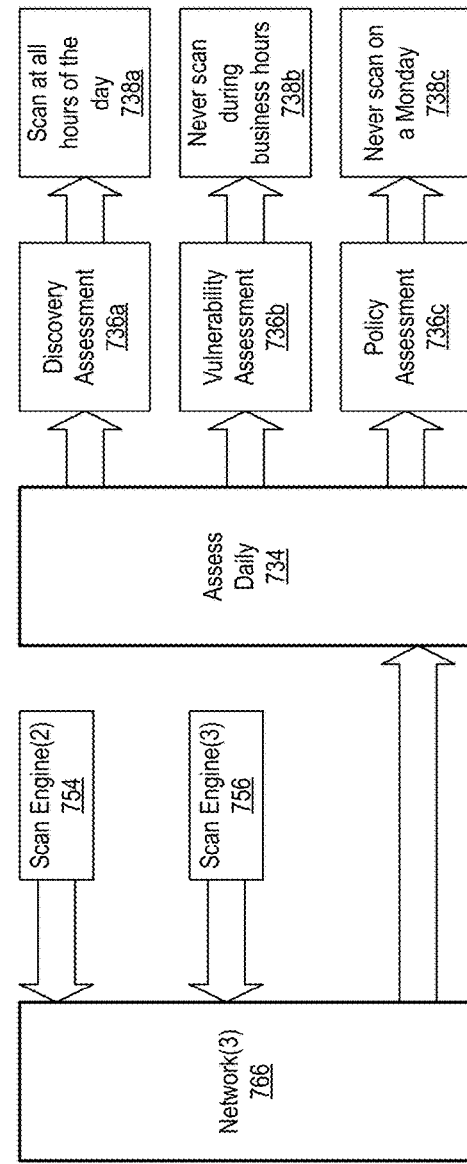

According to some embodiments, the assessment frequency 534 depicted in FIG. 5 may correspond to the frequency 134 of the scheduling parameters 130 received as part of the user input 120 of FIG. 1. The assessment frequency 534 of FIG. 5 may be utilized to define a frequency attribute of the assessment configuration 514, where the frequency attribute corresponds to how often assessments are to be completed (also referred to herein as "scan cadence"). According to various embodiments, the frequency attribute may correspond to one of a daily scan cadence, a weekly scan cadence, or a monthly scan cadence, among other alternatives. To illustrate, FIGS. 6 and 7 depict examples in which the scan cadences correspond to a weekly scan cadence and a daily scan cadence, respectively.

According to some embodiments, the assessment type 536 depicted in FIG. 5 may correspond to the type 136 of the scheduling parameters 130 received as part of the user input 120 of FIG. 1. The assessment type 536 of FIG. 5 may be utilized to define a type attribute of the assessment configuration 514, where the type attribute corresponds to a particular type of assessment to be completed (also referred to herein as a "scan type"). According to various embodiments, the type attribute may correspond to a vulnerability assessment, a policy assessment, or a discovery assessment, among other alternatives. To illustrate, FIGS. 6 and 7 depict examples in which the scan types correspond to a vulnerability assessment, a policy assessment, a discovery assessment, or a combination thereof.

According to some embodiments, the exclusion window 538 depicted in FIG. 5 may correspond to the exclusion window(s) 138 of the scheduling parameters 130 received as part of the user input 120 of FIG. 1. The exclusion window 538 of FIG. 5 may be utilized to define an exclusion window attribute of the assessment configuration 514, where the exclusion window attribute corresponds to when assessments are not to be performed (also referred to herein as a "blackout window"). Examples of exclusion windows may include business hours, particular days of the week, or particular times of the year (e.g., two weeks before a corporation's end of quarter), among numerous other alternatives. To illustrate, FIG. 6 depicts an example in which an exclusion window corresponds to particular days of the week (e.g., weekdays), and FIG. 7 depicts examples in which there is no exclusion window (e.g., scan at all hours of the day) and exclusion windows corresponding to particular hours of the day (e.g., business hours) or a particular day (e.g., Monday).

FIG. 5 illustrates that the assessment configuration 514 may identify a single scan engine or multiple scan engines to utilized to perform assessments/scans of particular networks, according to some embodiments. As an example, FIG. 5 illustrates that the assessment configuration 514 may identify a first scan engine 552 as a single scan engine to be utilized to perform assessments/scans of a first network 562. According to some embodiments, the first scan engine 552 of FIG. 5 may correspond to the first scan engine 152 of FIG. 1, and the first network 562 of FIG. 5 may correspond to the first network 162 of FIG. 1. As another example, FIG. 5 illustrates that the assessment configuration 514 may identify the first scan engine 552 and a second scan engine 554 as multiple scan engines to be utilized to perform assessments/scans of a second network 564. According to some embodiments, the second scan engine 554 of FIG. 5 may correspond to the second scan engine 154 of FIG. 1, and the second network 564 of FIG. 5 may correspond to the second network 164 of FIG. 1. As yet another example, FIG. 5 illustrates that the assessment configuration 514 may identify the second scan engine 554 and a third scan engine 556 as multiple scan engines to be utilized to perform assessments/scans of a third network 566. According to some embodiments, the third scan engine 556 of FIG. 5 may correspond to the third scan engine 156 of FIG. 1, and the third network 566 of FIG. 5 may correspond to the third network 166 of FIG. 1.

Thus, the automated assessment scheduling configuration workflow depicted in the example of FIG. 5 illustrates that automated assessment scheduling according to the present disclosure may simplify the management of complex assessment scheduling that includes multiple variables of consideration.

FIGS. 6 and 7 are block diagrams 600, 700 illustrating examples of automated assessment scheduling processes, in accordance with some embodiments.

Referring to FIG. 6, a block diagram 600 depicts a first example of an automated assessment scheduling process, in accordance with some embodiments.

FIG. 6 illustrates an example in which an assessment frequency 634 corresponds to a weekly scan cadence (depicted as "Assess Weekly" in FIG. 6). According to some embodiments, the assessment frequency 634 depicted in FIG. 6 may correspond to the frequency 134 of the scheduling parameters 130 received as part of the user input 120 of FIG. 1. The assessment frequency 634 of FIG. 6 may be utilized to define a frequency attribute of an assessment configuration, such as the assessment configuration 114 depicted in FIG. 1 or the assessment configuration 514 depicted in FIG. 5.

FIG. 6 further illustrates an example in which multiple scan types are both associated with the same exclusion window. To illustrate, multiple scan types 636 correspond to a vulnerability assessment and a policy assessment (depicted as "Vulnerability and Policy Assessment" in FIG. 6), with each associated with a single exclusion window 638 corresponding to particular days (depicted as "Never scan on a weekday" in FIG. 6). According to some embodiments, each of the scan types 636 depicted in FIG. 6 may correspond to the type 136 of the scheduling parameters 130 received as part of the user input 120 of FIG. 1 (where each of the different scan types may be received as separate user inputs, in some cases). Each of the scan types 636 of FIG. 6 may be utilized to define individual type attributes of an assessment configuration, such as the assessment configuration 114 depicted in FIG. 1 or the assessment configuration 514 depicted in FIG. 5. According to some embodiments, the exclusion window 638 depicted in FIG. 6 may correspond to the exclusion window(s) 138 of the scheduling parameters 130 received as part of the user input 120 of FIG. 1. The exclusion window 638 of FIG. 6 may be utilized to define an exclusion window attribute of an assessment configuration, such as the assessment configuration 114 depicted in FIG. 1 or the assessment configuration 514 depicted in FIG. 5.

FIG. 6 further illustrates an example in which a single scan engine is utilized to perform assessments/scans of a particular network. According to some embodiments, the assessment scheduler 116 of FIG. 1 may be utilized in combination with the scan manager 118 of FIG. 1 to automatically identify the single scan engine and to automatically schedule assessments/scans of the particular network. To illustrate, in FIG. 6, a first scan engine 652 is utilized to perform assessments/scans of a first network 662. According to some embodiments, the first scan engine 652 of FIG. 6 may correspond to the first scan engine 152 of FIG. 1 or the first scan engine 552 of FIG. 5, and the first network 662 of FIG. 6 may correspond to the first network 162 of FIG. 1 or the first network 562 of FIG. 5.

Referring to FIG. 7, a block diagram 700 depicts a second example of an automated assessment scheduling process, in accordance with some embodiments.

FIG. 7 illustrates an example in which an assessment frequency 734 corresponds to a daily scan cadence (depicted as "Assess Daily" in FIG. 7). According to some embodiments, the assessment frequency 734 depicted in FIG. 7 may correspond to the frequency 134 of the scheduling parameters 130 received as part of the user input 120 of FIG. 1. The assessment frequency 734 of FIG. 7 may be utilized to define a frequency attribute of an assessment configuration, such as the assessment configuration 114 depicted in FIG. 1 or the assessment configuration 514 depicted in FIG. 5.

FIG. 7 further illustrates an example in which different scan types are associated with different exclusion windows. To illustrate, a first scan type 736a corresponds to a discovery assessment, which is associated with a first exclusion window 738a that is undefined (depicted as "Scan at all hours of the day" in FIG. 7). A second scan type 736b corresponds to a vulnerability assessment, which is associated with a second exclusion window 738b corresponding to particular times (depicted as "Never scan during business hours" in FIG. 7). A third scan type 736c corresponds to a policy assessment, which is associated with a third exclusion window 738c corresponding to a particular day (depicted as "Never scan on a Monday" in FIG. 7). According to some embodiments, each of the scan types 736a, 736b, and 736c depicted in FIG. 7 may correspond to the type 136 of the scheduling parameters 130 received as part of the user input 120 of FIG. 1 (where each of the different scan types may be received as separate user inputs, in some cases). Each of the scan types 736a, 736b, and 736c of FIG. 7 may be utilized to define individual type attributes of an assessment configuration, such as the assessment configuration 114 depicted in FIG. 1 or the assessment configuration 514 depicted in FIG. 5. According to some embodiments, each of the exclusion windows 738a, 738b, and 738c depicted in FIG. 7 may correspond to the exclusion window(s) 138 of the scheduling parameters 130 received as part of the user input 120 of FIG. 1 (where each of the different exclusion windows may be received as separate user inputs, in some cases). Each of the exclusion windows 738a, 738b, and 738c of FIG. 7 may be utilized to define individual exclusion window attributes of an assessment configuration, such as the assessment configuration 114 depicted in FIG. 1 or the assessment configuration 514 depicted in FIG. 5.

FIG. 7 further illustrates an example in which multiple scan engines are utilized to perform assessments/scans of a particular network (see e.g., the scan engine assignment 442 as illustrated and described herein with respect to FIG. 4). According to some embodiments, the assessment scheduler 116 of FIG. 1 may be utilized in combination with the scan manager 118 of FIG. 1 to automatically identify the multiple scan engines and to automatically schedule assessments/scans of the particular network. To illustrate, in FIG. 7, a second scan engine 754 and a third scan engine 756 are utilized to perform assessments/scans of a third network 766. According to some embodiments, the second and third scan engines 754, 756 of FIG. 7 may correspond to the second and third scan engines 154, 156 of FIG. 1 or the second and third scan engines 554, 556 of FIG. 5, and the third network 766 of FIG. 7 may correspond to the third network 166 of FIG. 1 or the third network 566 of FIG. 5.

Thus, FIGS. 6 and 7 illustrate examples of automated assessment scheduling processes. FIGS. 6 and 7 illustrate that automated assessment scheduling processes according to the present disclosure may simplify the management of complex assessment scheduling that includes multiple variables of consideration.

FIG. 8 is a flowchart 800 that illustrates an example of an automated assessment scheduling process, according to some embodiments. According to various embodiments, one or more hardware processors (with associated memory) may be used to implement the automated assessment scheduling process depicted in the example of FIG. 8.

At operation 810, the process includes receiving a set of scheduling parameters. The set of scheduling parameters include at least: a frequency corresponding to how often assessments are to be completed via a particular automated assessment; and a type of assessment to perform in the particular automated assessment. For example, referring to FIG. 1, the assessment configuration interface 112 may receive the user input 120 that includes the scheduling parameters 130. FIG. 1 illustrates that the scheduling parameters 130 received as part of the user input 120 include at least the frequency 134 and the type 136. As described herein, for a particular assessment, the frequency 134 may correspond to how often assessments are to be completed, and the type 136 may correspond to a particular type of assessment to be completed (e.g., vulnerability, policy, discovery, etc.).

At operation 820, the process includes generating, based at least in part on the set of scheduling parameters, an assessment configuration comprising a set of attributes defining how the particular automated assessment is to be performed. For example, referring to FIG. 1, the assessment configuration 114 may be generated based at least in part on the scheduling parameters 130. As described herein, the assessment configuration 114 includes a set of attributes defining how a particular assessment is to be performed. For example, the frequency 134 may be utilized to define a frequency attribute of the assessment configuration 114, where the frequency attribute corresponds to how often assessments are to be completed (also referred to herein as "scan cadence") for a particular assessment. According to various embodiments, the frequency attribute may correspond to one of a daily scan cadence, a weekly scan cadence, or a monthly scan cadence, among other alternatives. As another example, the type 136 may be utilized to define a type attribute of the assessment configuration 114, where the type attribute corresponds to a particular type of assessment to be completed (also referred to herein as a "scan type"). According to various embodiments, the type attribute may correspond to a vulnerability assessment, a policy assessment, or a discovery assessment, among other alternatives.

At operation 830, the process includes identifying at least one scan engine resource of a set of scan engine resources for utilization in the particular automated assessment. For example, referring to FIG. 1, the assessment scheduler 116 in combination with the scan manager 118 may identify at least one scan engine of the set of scan engines 150 for utilization in the particular automated assessment. In the particular embodiment depicted in FIG. 1, the set of scan engines 150 includes at least the first scan engine 152, the second scan engine 154, and the third scan engine 156. In some cases, a single scan engine may be identified for utilization in the particular automated assessment (see e.g., FIG. 6). In other cases, multiple scan engines may be identified for utilization in the particular automated assessment (see e.g., FIG. 7).

At operation 840, the process includes automatically initiating, based at least in part on the assessment configuration and using the at least one scan engine resource, the particular automated assessment. For example, referring to FIG. 1, the particular automated assessment may be automatically initiated based at least in part on the assessment configuration 114 and using at least one scan engine of the set of scan engines 150.

Thus, FIG. 8 illustrates an example of a process of implementing automated assessment scheduling. The example process depicted in FIG. 8 may simplify the management of complex assessment scheduling that includes multiple variables of consideration.

Figure 9:
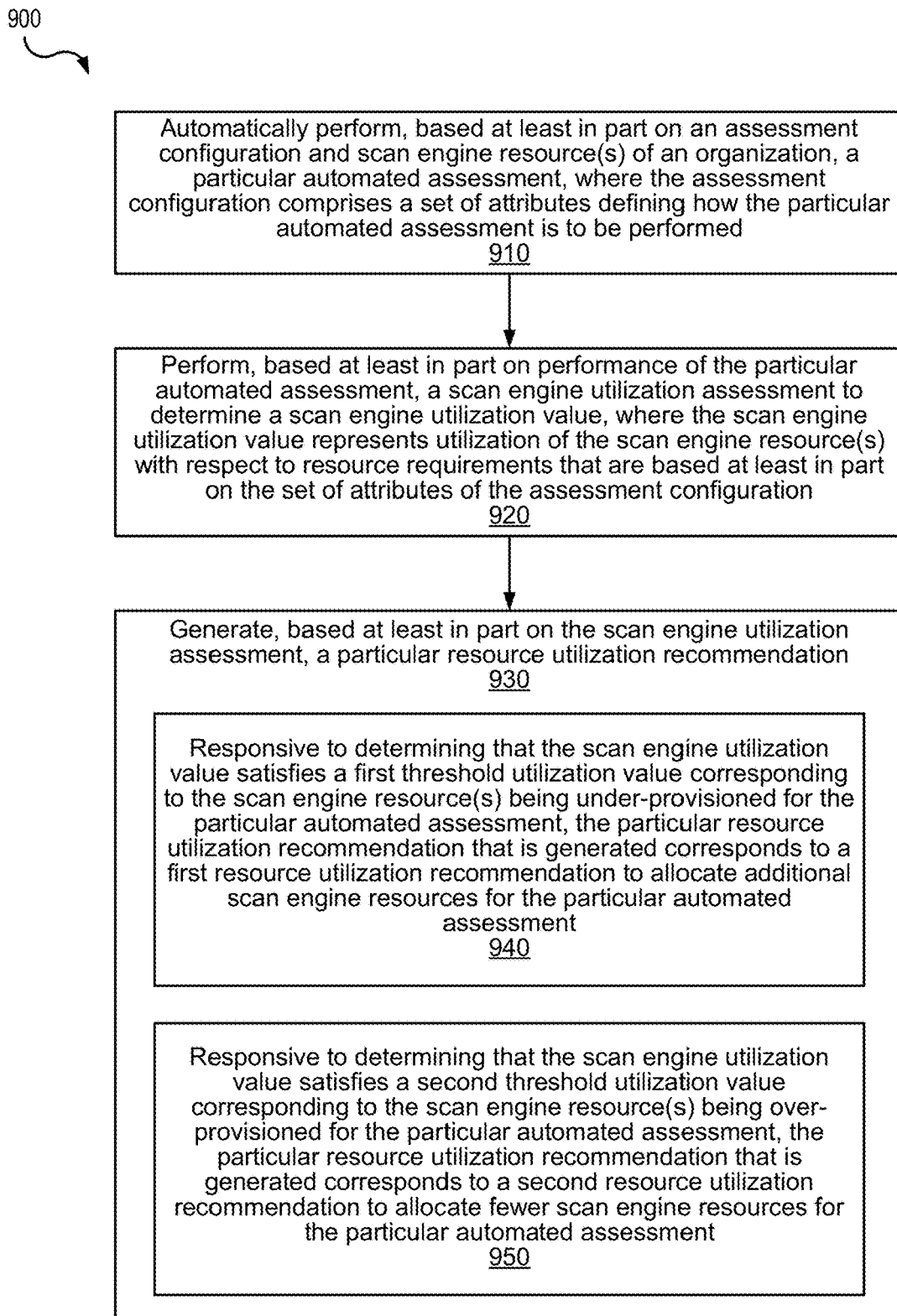
FIG. 9 is a flowchart that illustrates an example of an automated assessment scheduling process that includes generating a resource utilization recommendation, according to some embodiments.

FIG. 9 is a flowchart 900 that illustrates an example of an automated assessment scheduling process that includes generating a resource utilization recommendation, according to some embodiments. According to various embodiments, one or more hardware processors (with associated memory) may be used to implement the automated assessment scheduling process depicted in the example of FIG. 9.

At operation 910, the process includes automatically performing, based at least in part on an assessment configuration and one or more scan engine resources of an organization, a particular automated assessment. The assessment configuration comprises a set of attributes defining how the particular automated assessment is to be performed. For example, referring to FIG. 1, a particular automated assessment may be automatically performed based at least in part on the assessment configuration 114 and one or more scan engines of the set of scan engines 150.

At operation 920, the process includes performing, based at least in part on performance of the particular automated assessment, a scan engine utilization assessment to determine a scan engine utilization value. The scan engine utilization value represents utilization of the one or more scan engine resources with respect to resource requirements that are based at least in part on the set of attributes of the assessment configuration. For example, referring to FIG. 1, the scan manager 118 may perform a scan engine utilization assessment to determine a scan engine utilization value based at least in part on the performance of the particular automated assessment.

At operation 930, the process includes generating a particular resource utilization recommendation based at least in part on the scan engine utilization assessment. FIG. 9 illustrates that the particular resource utilization recommendation may correspond to one of a first resource utilization recommendation or a second resource utilization recommendation. For example, while not shown in FIG. 1, the assessment configuration interface 112 may be configured to generate the particular resource utilization recommendation (e.g., for presentation to the user 122) based at least in part on the scan engine utilization assessment performed by the scan manager 118. According to some embodiments, the first resource utilization recommendation may include an estimate of an additional number of scan engine resources to satisfy the resource requirements.

FIG. 9 illustrates, at operation 940, that the particular resource utilization recommendation that is generated may correspond to a first resource utilization recommendation to allocate additional scan engine resources for the particular automated assessment. The first resource utilization recommendation may be generated responsive to determining that the scan engine utilization value satisfies a first threshold utilization value corresponding to the one or more scan engines being under-provisioned for the particular automated assessment. According to some embodiments, the second resource utilization recommendation may include an estimate of a reduced number of scan engine resources to satisfy the resource requirements.

FIG. 9 illustrates, at operation 950, that the particular resource utilization recommendation that is generated may correspond to a second resource utilization recommendation to allocate fewer scan engine resources for the particular automated assessment. The second resource utilization recommendation may be generated responsive to determining that the scan engine utilization value satisfies a second threshold utilization value corresponding to the one or more scan engines being over-provisioned for the particular automated assessment.

Thus, FIG. 9 illustrates an example of a process of an automated assessment scheduling process that includes generating a resource utilization recommendation. FIG. 9 illustrates that the systems and methods of the present disclosure may provide the ability to identify when there are insufficient scan engine resources to accomplish desired scan scheduling preferences. In such cases, the user may be provided with feedback on whether or not additional resources are recommended as well as estimates on those additional resource recommendations. FIG. 9 further illustrates that the systems and methods of the present disclosure may provide the ability to identify over-provisioning of resources (that is, an excess number of scan engines). In such cases, the user may be provided with feedback to reduce the provisioned scan engine resources.

FIG. 10 is a block diagram illustrating an example computer system 1000 that is used to implement one or more portions of a system that implements automated assessment scheduling, according to some embodiments. For example, in some cases, the computer system 1000 may be a server that implements one or more components of the computing resource(s) 110 depicted in FIG. 1.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, in some cases, the executable instructions may include instructions to implement the assessment configuration interface 112, the assessment scheduler 116, and the scan manager 118, as discussed.

The system memory 1020 may also be used to store data 1026 needed or produced by the executable instructions. For example, the in-memory data 1026 may include portions of the assessment configuration 114, the inflight assessments 222, and the pending assessments 224, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:
one or more hardware processors with associated memory that implement automated assessment scheduling, wherein the one or more hardware processors are configured to:
automatically perform, based at least in part on an assessment configuration and one or more scan engine resources of an organization, a particular automated assessment of one or more assets of a particular network, wherein the assessment configuration comprises a set of attributes defining how the particular automated assessment is to be performed, including a frequency attribute specifying how often assessments are to be completed via the particular automated assessment;
perform, based at least in part on performance of the particular automated assessment, a scan engine utilization assessment to determine a scan engine utilization value, wherein the scan engine utilization value represents utilization of the one or more scan engine resources with respect to resource requirements that are based at least in part on the set of attributes of the assessment configuration; and
generate, based at least in part on the scan engine utilization assessment, a particular resource utilization recommendation, wherein the particular resource utilization recommendation corresponds to one of:
a first resource utilization recommendation to allocate additional scan engine resources for the particular automated assessment, wherein the first resource utilization recommendation is generated responsive to determining that the scan engine utilization value satisfies a first threshold utilization value corresponding to the one or more scan engine resources being under-provisioned for the particular automated assessment; or
a second resource utilization recommendation to allocate fewer scan engine resources for the particular automated assessment, wherein the second resource utilization recommendation is generated responsive to determining that the scan engine utilization value satisfies a second threshold utilization value corresponding to the one or more scan engine resources being over-provisioned for the particular automated assessment.

2. The system of claim 1, wherein the first resource utilization recommendation includes an estimate of an additional number of scan engine resources to satisfy the resource requirements.

3. The system of claim 1, wherein the second resource utilization recommendation includes an estimate of a reduced number of scan engine resources to satisfy the resource requirements.

4. The system of claim 1, wherein the set of attributes of the assessment configuration specifies a credential to use to perform the particular automated assessment.

5. The system of claim 1, wherein the frequency attribute corresponds to one of a daily scan cadence, a weekly scan cadence, or a monthly scan cadence.

6. The system of claim 1, wherein the set of attributes of the assessment configuration includes a type attribute corresponding to a type of assessment to perform in the particular automated assessment.

7. The system of claim 6, wherein the type attribute corresponds to one of a vulnerability assessment, a policy assessment, or a discovery assessment.

8. The system of claim 1, wherein a single scan engine resource of the one or more scan engine resources is identified for utilization in the particular assessment of the one or more assets of the particular network.

9. The system of claim 1, wherein multiple scan engine resources of the one or more scan engine resources are identified for utilization in the particular assessment of the one or more assets of the particular network.

10. A method comprising:
implementing, using one or more hardware processors, automated assessment scheduling, wherein the implementing comprises:
automatically performing, based at least in part on an assessment configuration and one or more scan engine resources of an organization, a particular automated assessment of one or more assets of a particular network, wherein the assessment configuration comprises a set of attributes defining how the particular automated assessment is to be performed, including a frequency attribute specifying how often assessments are to be completed via the particular automated assessment;
performing, based at least in part on performance of the particular automated assessment, a scan engine utilization assessment to determine a scan engine utilization value, wherein the scan engine utilization value represents utilization of the one or more scan engine resources with respect to resource requirements that are based at least in part on the set of attributes of the assessment configuration;
generating, based at least in part on the scan engine utilization assessment, a particular resource utilization recommendation, wherein the particular resource utilization recommendation corresponds to one of:
a first resource utilization recommendation to allocate additional scan engine resources for the particular automated assessment, wherein the first resource utilization recommendation is generated responsive to determining that the scan engine utilization value satisfies a first threshold utilization value corresponding to the one or more scan engine resources being under-provisioned for the particular automated assessment; or
a second resource utilization recommendation to allocate fewer scan engine resources for the particular automated assessment, wherein the second resource utilization recommendation is generated responsive to determining that the scan engine utilization value satisfies a second threshold utilization value corresponding to the one or more scan engine resources being over-provisioned for the particular automated assessment.

11. The method of claim 10, wherein the first resource utilization recommendation includes an estimate of an additional number of scan engine resources to satisfy the resource requirements.

12. The method of claim 10, wherein the second resource utilization recommendation includes an estimate of a reduced number of scan engine resources to satisfy the resource requirements.

13. The method of claim 10, wherein the set of attributes of the assessment configuration specifies a credential to use to perform the particular automated assessment.

14. The method of claim 10, wherein the frequency attribute corresponds to one of a daily scan cadence, a weekly scan cadence, or a monthly scan cadence.

15. The method of claim 10, wherein the set of attributes of the assessment configuration includes a type attribute corresponding to a type of assessment to perform in the particular automated assessment.

16. The method of claim 10, wherein the type of attribute corresponds to one of a vulnerability assessment, a policy assessment, or a discovery assessment.

17. One or more non-transitory computer-accessible storage media storing program instructions that, when executed on or across one or more processors, implement at least a portion of a system that implements automated assessment scheduling and cause the system to:
automatically perform, based at least in part on an assessment configuration and one or more scan engine resources of an organization, a particular automated assessment of one or more assets of a particular network, wherein the assessment configuration comprises a set of attributes defining how the particular automated assessment is to be performed, including a frequency attribute specifying how often assessments are to be completed via the particular automated assessment;
perform, based at least in part on performance of the particular automated assessment, a scan engine utilization assessment to determine a scan engine utilization value, wherein the scan engine utilization value represents utilization of the one or more scan engine resources with respect to resource requirements that are based at least in part on the set of attributes of the assessment configuration; and
generate, based at least in part on the scan engine utilization assessment, a particular resource utilization recommendation, wherein the particular resource utilization recommendation corresponds to one of:
a first resource utilization recommendation to allocate additional scan engine resources for the particular automated assessment, wherein the first resource utilization recommendation is generated responsive to determining that the scan engine utilization value satisfies a first threshold utilization value corresponding to the one or more scan engine resources being under-provisioned for the particular automated assessment; or
a second resource utilization recommendation to allocate fewer scan engine resources for the particular automated assessment, wherein the second resource utilization recommendation is generated responsive to determining that the scan engine utilization value satisfies a second threshold utilization value corresponding to the one or more scan engine resources being over-provisioned for the particular automated assessment.

18. The one or more non-transitory computer-accessible storage media of claim 17, wherein the first resource utilization recommendation includes an estimate of an additional number of scan engine resources to satisfy the resource requirements.

19. The one or more non-transitory computer-accessible storage media of claim 17, wherein the second resource utilization recommendation includes an estimate of a reduced number of scan engine resources to satisfy the resource requirements.

20. The one or more non-transitory computer-accessible storage media of claim 17, wherein the program instructions when executed on or across the one or more processors cause the system to:
generate an assessment configuration interface, the assessment configuration interface configured to output the particular resource utilization recommendation.

\* \* \* \* \*